US006249803B1

(12) United States Patent
Jindal et al.

(10) Patent No.: US 6,249,803 B1
(45) Date of Patent: Jun. 19, 2001

(54) METHOD AND APPARATUS FOR EXECUTING CODE DURING METHOD INVOCATION

(75) Inventors: Anita Jindal, Cupertino; Ken M. Cavanaugh, Montara; Sanjeev Krishnan, Sunnyvale; Rohit Garg, San Jose, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/993,287

(22) Filed: Dec. 18, 1997

(51) Int. Cl.[7] ...................................................... G06F 13/00

(52) U.S. Cl. ............................................ 709/203; 709/229

(58) Field of Search ............................ 707/103; 395/613, 395/872, 183.21, 183.09, 704; 709/171, 315–318, 203, 229; 714/712, 47; 209/231, 238

(56) References Cited

U.S. PATENT DOCUMENTS 4,823,310 4/1989 Grand .
5,218,699 6/1993 Brandle et al. .
5,263,160 11/1993 Porter et al. .
5,307,490 4/1994 Davidson et al. .
5,341,478 8/1994 Travis, Jr. et al. .
5,455,951 10/1995 Bolton et al. .
5,475,845 12/1995 Orton et al. .
5,481,706 1/1996 Peek .
5,491,800 2/1996 Goldsmith et al. .
5,493,680 2/1996 Danforth .
5,515,508 5/1996 Pettus et al. .
5,540,014 7/1996 Smith .
5,566,302 10/1996 Khalidi et al. .
5,577,261 11/1996 Hamilton et al. .
5,619,710 * 4/1997 Travis, Jr. et al. .................. 709/203
5,682,534 10/1997 Kapoor et al. .
5,692,157 * 11/1997 Williams .............................. 709/246

(List continued on next page.)

OTHER PUBLICATIONS

OMG Security Specification Document Format/97–11–05, pp. 15–9 to 15–10; pp. 15–147 to 15–162 (Section 15–7); pp. 15–219 to 15–230 (appendix B–6 to B–9.3) OMG Website—www.omg.org.

(List continued on next page.)

*Primary Examiner*—Robert B. Harrell
*Assistant Examiner*—Thong Vu
(74) *Attorney, Agent, or Firm*—Kurdirks & Jobse, LLP

(57) ABSTRACT

One or more filters may be included in each object implementation in a CORBA distributed object system. Each CORBA server object maintains a registry of filters containing unique identifiers and specifications for each of the filters and the order in which the filters must be applied. The filters execute selected code either before or after the conventional marshaling and unmarshaling which take place during a method invocation in the system. The CORBA client object builds a filter registry, from information that it received from the server. Filters may also be present in the client side of the ORB in order to execute code before and after the marshaling and unmarshaling that takes place in the client side of the ORB and these latter filters are also included in the client filter registry. The client then uses its filter registry to invoke the filters during a subsequent method invocation. The client also receives a time stamp from the server to identify the current filter composition. In method invocations to the server, the client includes the value of the time stamp it received and the server returns an exception to the client if the time stamps do not match. In response to this exception, the client re-invokes the __retrieve__filters() method in order to obtain the most recent filter registry contents and time stamp from the server.

73 Claims, 9 Drawing Sheets

U.S. PATENT DOCUMENTS

| | | | | |
|---|---|---|---|---|
| 5,699,518 | * | 12/1997 | Held et al. | 709/229 |
| 5,724,503 | | 3/1998 | Kleinman et al. . | |
| 5,727,145 | * | 3/1998 | Nessett et al. | 395/186 |
| 5,734,903 | * | 3/1998 | Saulpaugh et al. | 709/171 |
| 5,737,607 | | 4/1998 | Hamilton et al. . | |
| 5,740,355 | * | 4/1998 | Watanabe et al. | 395/183.21 |
| 5,748,881 | * | 5/1998 | Lewis et al. | 714/47 |
| 5,748,963 | | 5/1998 | Orr . | |
| 5,751,962 | | 5/1998 | Fanshier et al. . | |
| 5,758,342 | | 5/1998 | Gregerson . | |
| 5,761,670 | | 6/1998 | Joy . | |
| 5,787,251 | | 7/1998 | Hamilton et al. . | |
| 5,787,447 | | 7/1998 | Smithline et al. . | |
| 5,790,848 | | 8/1998 | Wlaschin . | |
| 5,793,965 | | 8/1998 | Vanderbilt et al. . | |
| 5,809,507 | * | 9/1998 | Cavanaugh, III | 707/103 |
| 5,815,703 | * | 9/1998 | Copeland et al. | 395/613 |
| 5,819,093 | * | 10/1998 | Davidson et al. | 395/704 |
| 5,832,487 | | 11/1998 | Olds et al. . | |
| 5,835,906 | | 11/1998 | Hagersten et al. . | |
| 5,848,236 | * | 12/1998 | Dearth et al. | 395/183.09 |
| 5,852,731 | | 12/1998 | Wang et al. . | |
| 5,862,376 | | 1/1999 | Steele, Jr. et al. . | |
| 5,864,866 | * | 1/1999 | Henckel et al. | 707/103 |
| 5,870,605 | * | 2/1999 | Bracho et al. | 709/318 |
| 5,873,116 | | 2/1999 | Van Fleet . | |
| 5,881,315 | * | 3/1999 | Cohen | 395/872 |
| 5,892,946 | | 4/1999 | Woster et al. . | |
| 5,893,118 | | 4/1999 | Sonderegger . | |
| 5,907,674 | | 5/1999 | Aahlad . | |
| 5,913,038 | * | 6/1999 | Griffiths | 709/231 |
| 5,915,252 | * | 6/1999 | Misheski et al. | 707/103 |
| 5,926,775 | | 7/1999 | Brumley et al. . | |
| 5,928,323 | | 7/1999 | Gosling et al. . | |
| 5,933,605 | * | 8/1999 | Kawano et al. | 709/238 |
| 5,953,530 | | 9/1999 | Rishi et al. . | |
| 5,958,006 | * | 9/1999 | Eggleston et al. | 709/219 |
| 5,974,410 | * | 10/1999 | Copeland et al. | 707/3 |
| 5,978,940 | * | 11/1999 | Newman et al. | 714/712 |
| 5,991,823 | * | 11/1999 | Cavanaugh, III et al. | 709/304 |
| 6,016,499 | | 1/2000 | Ferguson . | |
| 6,044,409 | | 3/2000 | Lim et al. . | |
| 6,101,569 | | 8/2000 | Miyamoto et al. . | |
| 6,128,640 | | 10/2000 | Kleinman . | |

OTHER PUBLICATIONS

The Orbix 2 Reference Guide, Release 2.0 Nov. 1995, pp. 197–209; The Orbix 2 Programming Guide, Release 2.0 Nov. 1995, pp. 143, pp. 189–196, pp. 303–304—Support@iona.com.

Evaluations, Orbix (IONA), pp. 1–2—http://www.c3.lanl.gov/village/dist–comp/section2_5_2.html.

Orbix, Market–Leading Implementation of CORBA 2, pp. 1–3—http://www.blackwhite.com/products/orbix.html.

IONA Technologies, IONA Delivers Full Suite of Features for Orbix 2.1, pp. 1–2—http://www.iona.com/news/pressroom/Orbix21Features.html.

Iona Technologies, Apr. 1994, Version 1.2.1 Release Notes, pp. 1–4—http://www.up.ac.za/hsn/docs/orbix/RelNotes12.txt.

IONA Technologies, Orbix C+++ Version(s): All, pp. 1—http://www–usa.iona.com/support/kb/Orbix C++/articles/324.805.html.

IONA Technologies, Orbix C++ Version(s): 2.x, pp. 1—http://www–usa.iona.com/support/kb/Orbix C++/articles/238.214.html.

IONA Technologies, Orbix C++ Version(s): 2.x, pp. 1–2—http://www–usa.iona.com/support/kb/Orbix C++/articles/239.540.html.

IONA Technologies, Orbix C++ Version(s): All, pp. 1–2—http://www–usa.iona.com/support/kb/Orbix C++/articles/351.196.html.

IONA Technologies, Orbix C++ Version(s): All, pp. 1–2—http://www–usa.iona.com/support/kb/Orbix C++/articles/352.291.html.

IBM Technical Disclosure Bulletin, "Remote Procedure Call Stub Size Reduction Technique—Combining Parameter Code", vol. 36, No. 09B, Sep., 1993, pp. 351–352.

IBM Technical Disclosure Bulletin, "Callos2w XP 000587433" vol. 39, No. 04, Apr. 1996, pp. 91–96.

IBM's SOMobjects Developer Toolkit, Users Guide, "An Introductory Guide to the System Object Model and Its Accompanying Frameworks", Version 2.0, Jun., 1993.

Object Management Group, "The Common Object Request Broker: Architecture and Specification" Revision 2.0, Jul., 1995.

Hamilton, Graham, et al., "Subcontract: A Flexible Base for Distributed Programming", Apr., 1993.

Shapiro, Marc, "A Binding Protocol For Distributed Shared Objects", IEEE, 1994, pp. 134–141.

Bhoedjang, R.A.F., et al., "Friendly and Efficient Message Handling", IEEE, 1996, pp. 121–130.

(BULL) Groupe Bull et al. "Joint Project Services Submission—Life Cycle and Association Services Specification".

Roger S. Chin et al., "Distributed Object–Based Programming Systems".

Silicon Graphics, "Iterators", http://www.rt.e–technik.tu-darmstadt.de/~mali/DOC/STL_doc/iterators.html, pp. 1–3.

* cited by examiner

METHOD AND APPARATUS FOR EXECUTING CODE DURING METHOD INVOCATION

CROSS REFERENCE TO RELATED APPLICATIONS

The following U.S. patent applications are related to the present application and are incorporated by reference herein in their entirety:

U.S. patent application Ser. No. 08/554,794, filed Nov. 7, 1995 as a continuation to U.S. patent application Ser. No. 07/995,863, filed Dec. 21, 1992 (now abandoned);

U.S. patent application Ser. No. 08/670,682, filed Jun. 26, 1996;

U.S. patent application Ser. No. 08/673,181, filed Jun. 26, 1996;

U.S. patent application Ser. No. 08/670,700, filed Jun. 26, 1996;

U.S. patent application Ser. No. 08/670,681, filed Jun. 26, 1996;

U.S. patent application Ser. No. 08/670,684, filed Jun. 26, 1996;

U.S. patent application Ser. No. 08/669,782, filed Jun. 26, 1996;

U.S. Patent Application entitled "Method and Apparatus for Deferred Throwing of Exceptions in C++", filed by Christian J. Callsen and Ken M. Cavanaugh, assigned attorney docket no. 6205491 and filed on an even date herewith;

U.S. Patent Application entitled "Method and Apparatus for Fast, Local CORBA Object References", filed by Christian J. Callsen and Ken M. Cavanaugh, assigned attorney docket no. 08/993,800 and filed on an even date herewith;

U.S. Patent Application entitled "Method and Apparatus for Constructing Stable Iterators in a Shared Data Collection", filed by Christian J. Callsen and Ken M. Cavanaugh, assigned attorney docket no. 6016489 and filed on an even date herewith;

U.S. Patent Application entitled, "Method and Apparatus for Enforcing Locking Invariants in Multi-Threaded Systems", filed by Christian J. Callsen and Ken M. Cavanaugh, assigned attorney docket no. 08/993,206 and filed on an even date herewith;

U.S. Patent Application entitled, "Method and Apparatus for Efficient Representation of Variable Length Identifiers in a Distributed Object System", filed by Ken M. Cavanaugh, assigned attorney docket no. 08/993,204 and filed on an even date herewith; and U.S. Patent Application entitled, "Marshaling And Unmarshaling Framework For Supporting Filters In A Distributed Object System", filed by Anita Jindal, Ken M. Cavanaugh and Sanjeev Krishnan, assigned attorney docket no. 08/993,263 and filed on an even date herewith.

FIELD OF THE INVENTION

This invention relates to distributed object systems using common object request broker architecture (CORBA) and, more particularly, to a method and apparatus for providing a filter framework for the execution of code during a method invocation.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features.

As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and re-used in many cases, thereby reducing the development effort.

As will be understood by those skilled in the art, objects in the context of object-oriented programming are software entities comprising data and methods or operations on that data. The methods of an object collectively form an interface for manipulating the data in the object. The objects exist only at program runtime and are created, or instantiated, from object "classes" which are actually written by the programmer. The class code written by a programmer can be "reused" by another programmer by instantiating objects from that code.

In order to further reduce the programming burden, distributed object systems have been developed in which methods in objects resident on a server can be executed or invoked remotely over a network from a client application. In this manner, the objects can be developed and maintained by a party different from the party that developed the client application. In such a system information is routed or streamed between the client and the server. This information includes requests from the client to invoke an object on the server and results and data from the method invocation returning from the server to the client. In addition, object-oriented programs often communicate by streaming objects from one program to another.

In such streaming operations, a stream writer organizes, or marshals, the information to form a serial data stream. The serial data stream is then sent to the server where a stream reader unmarshals the serial data stream to reconstruct a copy of the original information. The stream reader must operate such that the unmarshaling exactly "undoes" the effect of the marshaling so that the original information can be reconstructed. Ordinarily, such an operation does not present a problem, but when the stream reader is not written by the same author as the stream writer there can be incompatibilities.

In order to standardize the marshaling and unmarshaling and data transfer process, an industry consortium called the Object Management Group (OMG) was formed whose mission is to define a set of interfaces for inter-operable software. Its first specification, the Common Object Request Broker Architecture (CORBA) specification, is an industry consensus standard that hides all differences between programming languages, operating systems, and object location. The CORBA standard defines an object request broker (ORB) that handles the marshaling, transport and unmarshaling of information between applications. The ORB functions as a communication infrastructure, transparently relaying object requests across distributed heterogeneous computing environments. Inter-operability is accomplished through well-defined object interface specifications which allow client applications to connect to the ORB. CORBA provides an implementation independent notation for defining interfaces called the OMG Interface Definition Language (IDL).

The OMG CORBA specification defines an implementation independent object model which is actually built with a programming language, such as C++ or Java. In this model CORBA objects (also called "servants"), which are implemented by servers, have references that can be exported to clients. Clients and servers are roles, not mutually exclusive tasks for a single program, so that any one program can be both a client and a server. Objects and object references are typically different programming language objects, although they do not have to be.

In a server, the implementation of an actual object which can be used to satisfy an invocation on a CORBA object is generally both platform and language dependent and various models are possible for implementing objects in servers. The original CORBA standard defined a Basic Object Adapter (or BOA) which is a framework that adapts the server implementation to the implementation independent ORB. A newer OMG portability standard defines a Portable Object Adapter (or POA), which replaces the BOA and is intended to be platform independent. Many ORBs also support other proprietary frameworks for implementing CORBA objects. All of these frameworks are commonly referred to as Object Adapters (or OAs).

An application programmer using object request broker technology may want to execute code segments as a part of the method invocation process, specifically during the marshaling and unmarshaling processes. Such code segments may operate to monitor and debug a program, or to implement security mechanisms, for example. Filters, that is, sections of code which execute during the method invocation process before or after marshaling or unmarshaling of arguments in an object request broker system, are known. Filters may be used to perform a variety of tasks, such as compression, encryption, tracing, or debugging, that may be applied to communications to or from an object. However, such filters are typically statically defined for client and server objects and compiled with the client and server code, respectfully.

Simulation, debugging, and other operations would be greatly enhanced if filters could be defined and modified during system operation.

SUMMARY OF THE INVENTION

In accordance with the principles of the invention, one or more filters may be included in the skeleton code for each object implementation and each server object maintains a registry of filters containing unique identifiers and specifications for each of the filters and the order in which the filters must be applied. The filters execute selected code either before or after the conventional marshaling and unmarshaling which take place during a method invocation.

The client includes a filter registry, which is built when the client side ORB invokes a special method, __retrieve__filters(), on a server. In response to a __retrieve__filters() call, the server passes the identification of the filters associated with an object implementation, and the order in which they should be invoked, to the client. The client constructs a registry of filters arranged in the order they should be applied, and uses this filter registry during subsequent method invocations.

In accordance with another aspect of the invention, filters may be added to or subtracted from the filter list during system operation without bringing down the server. The server initializes a timestamp to identify the current filter composition and updates the timestamp with each modification to its filter registry. When a client retrieves a list of the filters available on the server, using the __retrieve__filters() method, the server passes the time stamp to the client. In subsequent method invocations to the server, the client includes the value of the time stamp it received. The server compares the time stamp in the method invocation to its own time stamp and returns an exception to the client if the time stamps do not match. In response to this exception, the client re-invokes the __retrieve__filters() method in order to obtain the most recent filter registry contents and time stamp from the server. The client then proceeds to re-invoke the method using the newly received filter list and time stamp.

In another aspect of the presently preferred embodiment, filter code may be downloaded on the client side during system operation when the ORB supports class downloading, such as a Java-based ORB. In the Java-based environment, the application programmer registers both the client and server side filter code with an object implementation. The client side ORB invokes __retrieve__filters() method and receives an ordered list of filter identifications. The client side ORB then, dynamically loads the filter code from the server using a Java class loader, creates a new instance of the loaded filter class, and stores the new instance in the client side filter registry.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
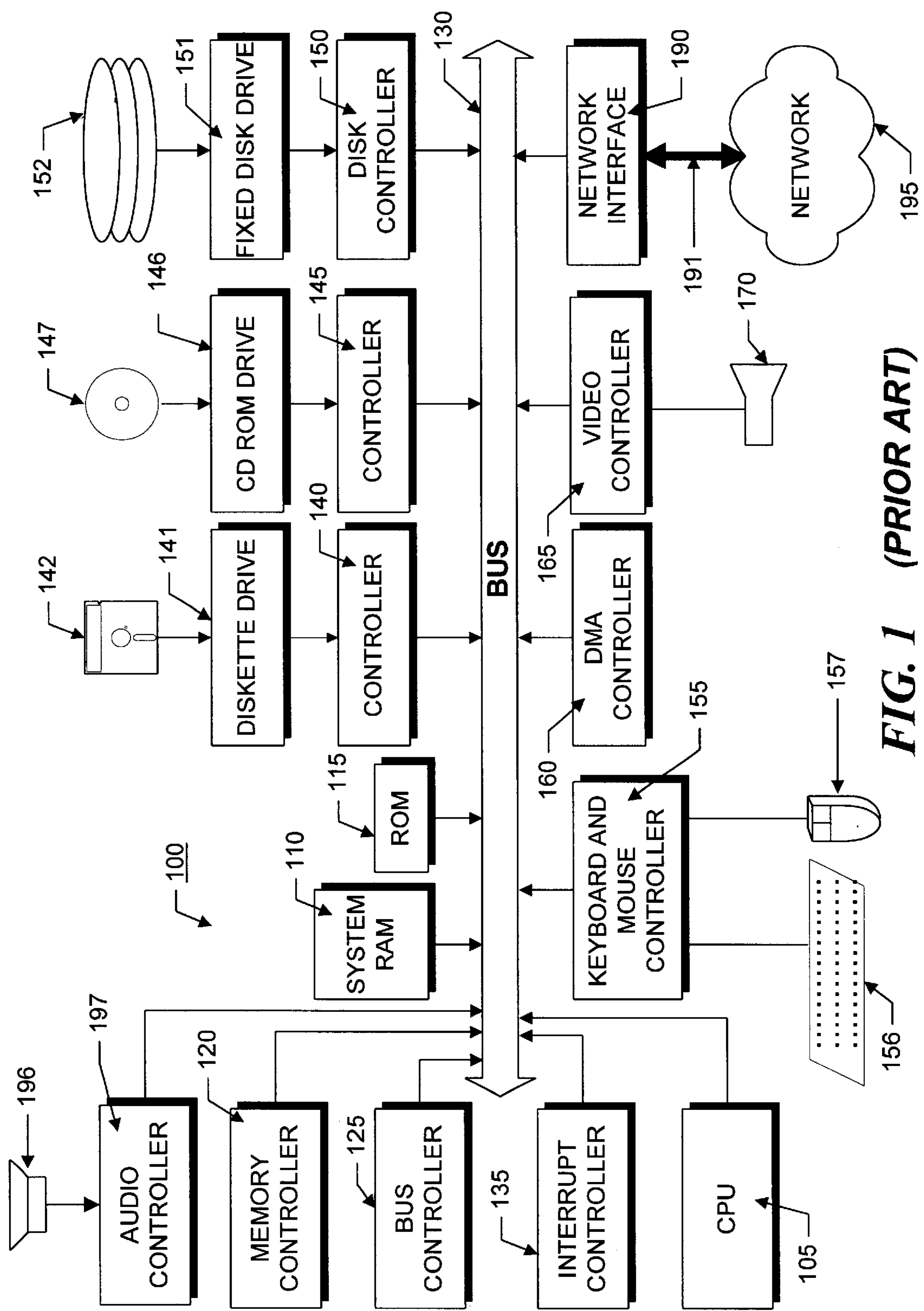
FIG. 1 is a schematic block diagram of an illustrative prior art hardware platform which forms part of a computer system on which the invention can be run.

FIG. 1 illustrates the system architecture for an exemplary client computer 100, such as an IBM THINKPAD 701® computer or Digital Equipment Corporation HiNote™ computer, on which the disclosed network access system (system) can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

Client computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 2:
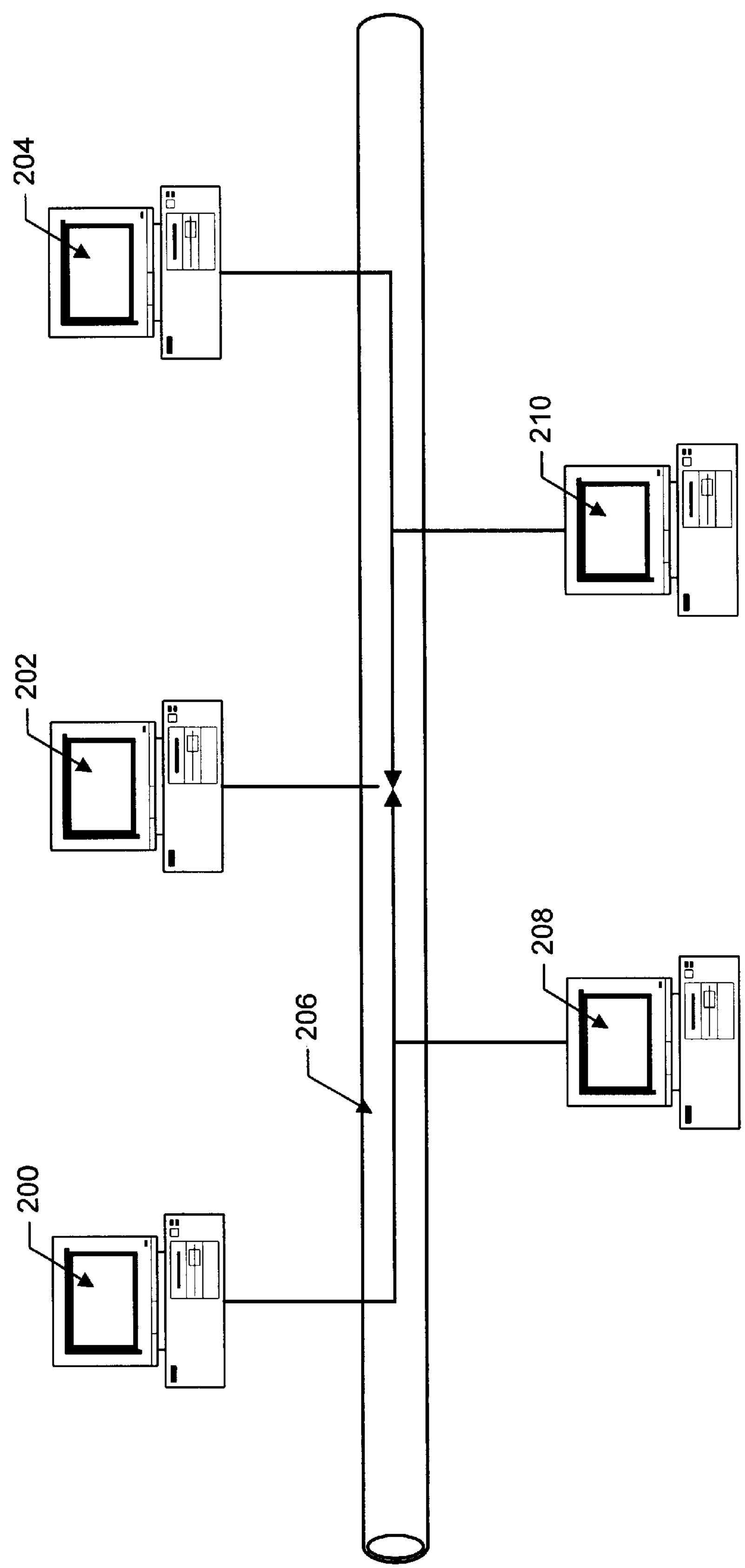
FIG. 2 is a schematic diagram of a prior art computer network system on which a CORBA system can be built.

FIG. 2 illustrates, in a very simple fashion, the connection of a number of computing systems, such as that shown in FIG. 1, to form a distributed computing facility. Each of the individual stations 200, 202, 204, 208 and 210 are interconnected by a network mechanism. Although the distributing computing facility could exist on a single computing system, it is more likely to operate over a network transport medium. Such a transport medium may be LAN as shown in FIG. 2, but may also be other network arrangements, including the Internet. All that is necessary is that the terminals 200, 202, 204, 208 and 210 be able to communicate with each other using predefined protocols to exchange information. As previously mentioned, the CORBA architecture overlays such a network and relieves the individual applications from dealing with the details of transporting information over the network. More particularly, the CORBA architecture hides all of the details and the actual network protocols from the application programs. It assures that the application programs operate with each other regardless of the platforms on which the software is designed to run and regardless of the network protocols used to interconnect separate computing systems.

Figure 3:
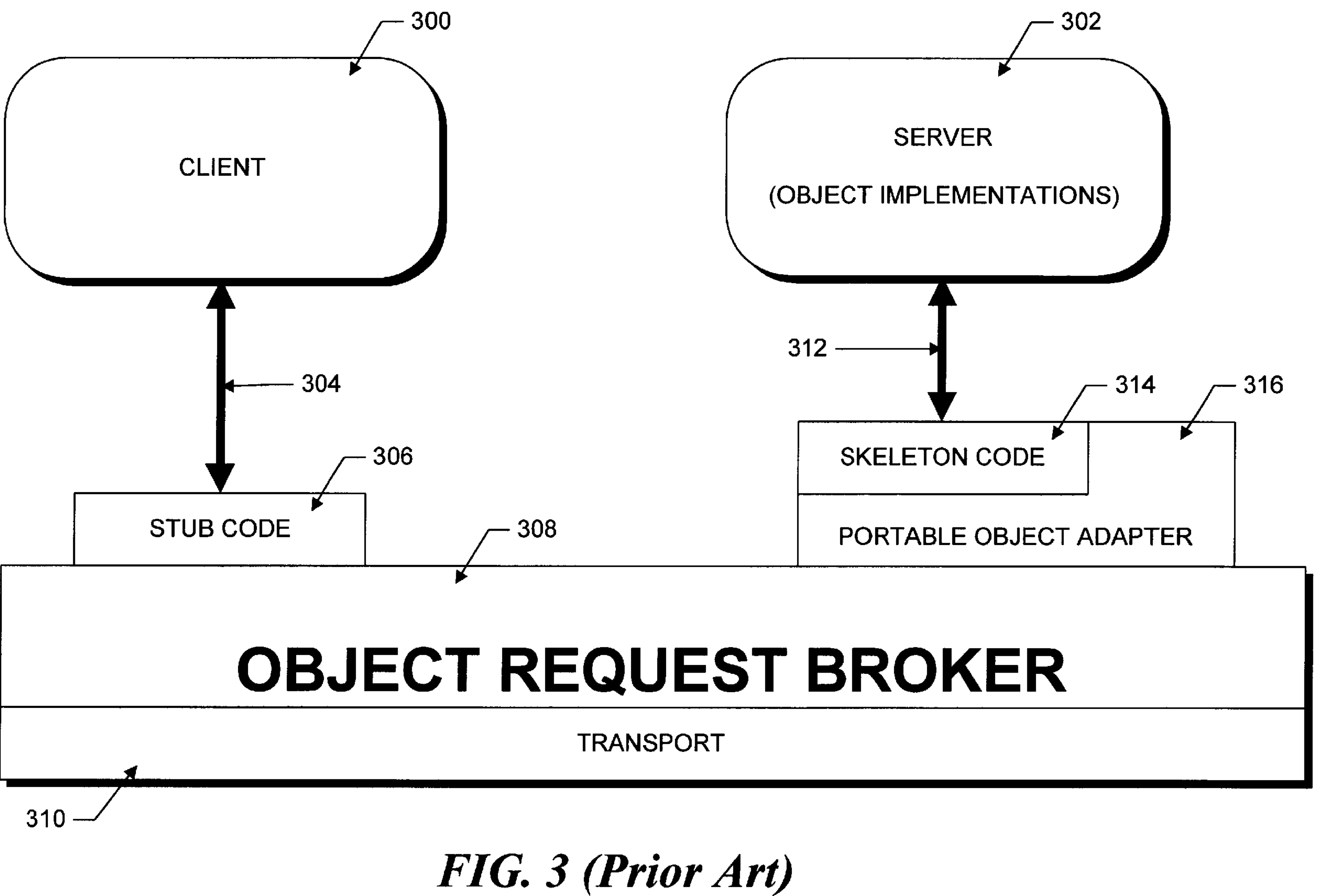
FIG. 3 is a block schematic diagram illustrating a prior art CORBA environment.

FIG. 3 illustrates, in a very schematic form, the basic CORBA architecture which defines a peer-to-peer distributed computing facility where all applications are objects (in the sense of object orientation). Objects can alternate between client roles 300 and server roles 302. An object operates in a client role 300 when it is the originator of an object invocation. An object operates in a server role 302, called an object implementation, when it is the recipient of an object invocation.

The client 300 communicates with the server 302 by means of an object request broker or ORB 308. The ORB 308 operates with a transport 310 that conveys information between the client 300 and server 302 and, as previously mentioned, the ORB 308 handles the marshaling, transport and unmarshaling of information between client 300 and server 302. The client 300 communicates with the ORB 308, as indicated schematically by arrow 304, by means of an implementation independent syntax which describes object encapsulations. This syntax is called an interface definition language (IDL) and is defined in the CORBA specification generated by OMG. The OMG interface definition language can be used to define interfaces that have attributes and operation signatures. The language also supports inheritance between interface descriptions in order to facilitate reuse by developers. Objects or servants in the server 302 export object references with interfaces specified by the OMG IDL for use by clients. The object reference contains an identification of the object implementation so that the server 302 can pass a request to the correct object.

The entire CORBA architecture is actually implemented in a conventional programming language, such as C, C++, Java, or Smalltalk. Implementations in a variety of languages are available from a number of vendors who typically provide an IDL compiler bundled with their ORB products. The IDL compilers generate header files which define the OMG IDL interfaces and can be incorporated into application programs. The IDL compilers also generate stub code 306 and skeleton code 314 for each interface.

The client application program 300 can link directly to the OMG IDL stub code 306. As far as the client application program is concerned, an invocation of the stub code 306 appears to be a local function call. Once invoked, the stub code 306 provides an interface to the ORB 308 that performs marshaling to encode and unmarshaling to decode the operation's parameters into/from communication formats suitable for transmission on the transport 310 to/from the server 302.

At the server side, the OMG IDL skeleton code 314 is the corresponding implementation of the OMG IDL interface. When the ORB 308 receives a request, the skeleton code 314 unmarshals the request parameters and generates a call, indicated schematically by arrow 312, to an object implementation in the server 302. When the server completes processing of the request, the skeleton code 314 and stub code 306 return the results to the client program 300. If an error has occurred, exception information generated by the server or by the ORB is returned.

An object adapter 316 comprises the interface between the ORB 308, the skeleton code 314 and the server 302. Object adapters, such as adapter 316, support functions, such as registration of object implementations and activation of servers. There are many potential types of object adapters, depending on the purpose of the adapter. The original CORBA specification defined only a general-purpose Basic Object Adapter or BOA. The BOA performs some basic functions. For example, when a client request specifies an inactive server process, the BOA automatically activates the server process. When the server is activated it registers its implementation with the BOA. The BOA then stores this registration to use in future object requests. After an object is activated, it can receive client requests by means of a callback method in the skeleton code 314. BOA services also include exception handling and object reference management.

Figure 4:
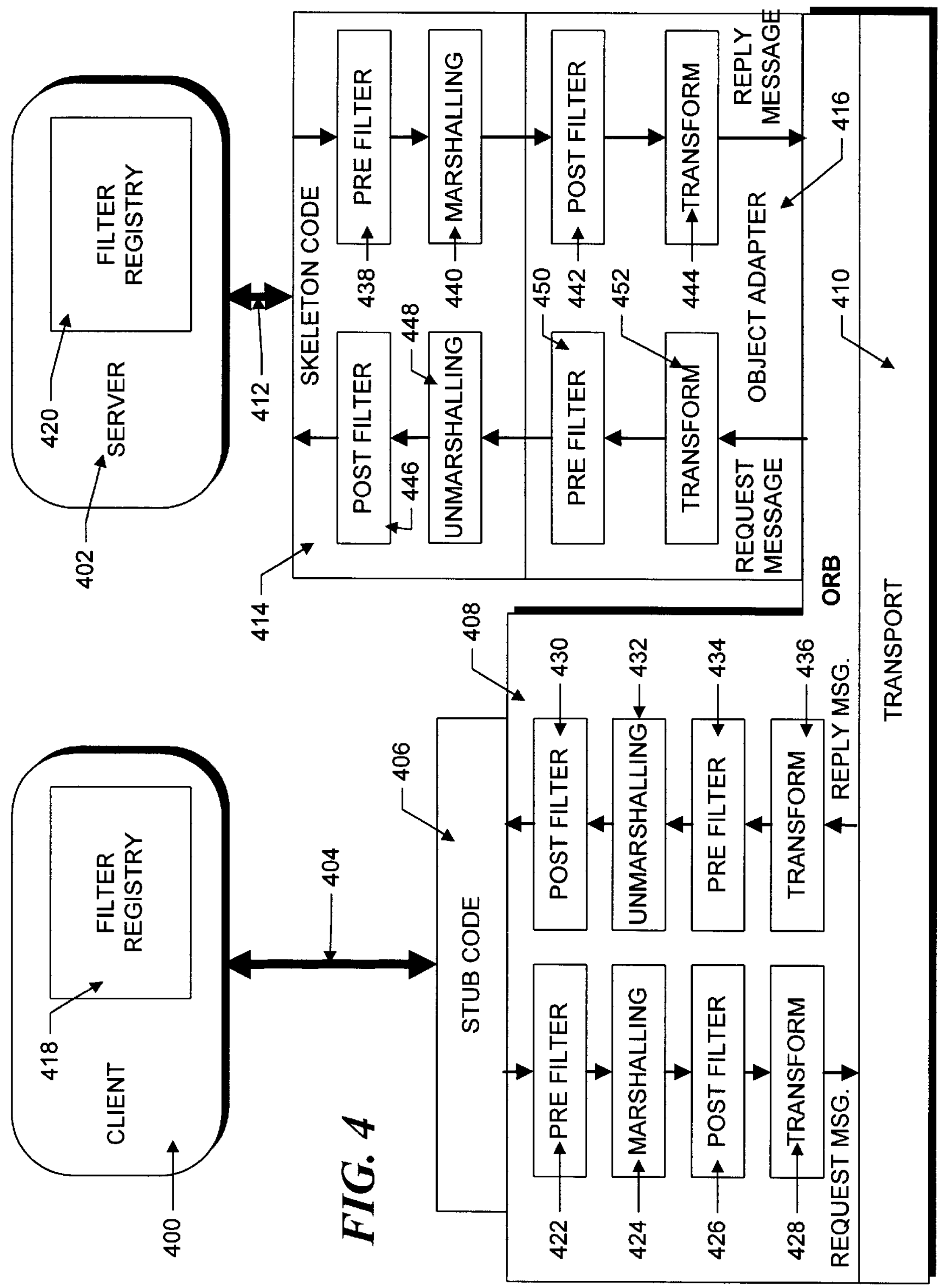
FIG. 4 is a block schematic diagram illustrating a CORBA environment including client and server filters constructed in accordance with the principles of the invention.

The block schematic diagram of FIG. 4 illustrates the addition of filters to the FIG. 3 ORB architecture. In FIG. 4, elements which correspond to elements in FIG. 3 have been given corresponding numeral designations. For example, stub code 306 in FIG. 3 corresponds to stub code 406 in FIG. 4. On the client side, the client 400 interacts with the stub code 406 which, in turn, communicates with the ORB 408. The ORB 408 contains implementations of the client side filters 422–436. On the server side, the object adapter 416 contains implementations of the server side filters 438–452.

Filters are classified in accordance with the relative place within a method invocation process where they are applied and depending on the type of message to which they are applied. Thus, the filters can be categorized as pre-request, post-request, pre-reply, and post-reply filters. The pre-request filters 422 and 450 are applied before marshaling 424 of arguments on the client side in a request message and before unmarshaling 448 the request arguments in the skeleton 414. The post-request filters 426 and 446 are applied after marshaling 424 of arguments on the client side and after unmarshaling 448 the request arguments in the skeleton 414. It should be noted that, although only one element is shown for each type of filter in FIG. 4, there may actually be several separate pre-filters, several separate post-filters, etc. Each filter can be separately enabled or disabled.

Similarly, the pre-reply filters 438 and 434 are applied before marshaling 440 of the reply results in the skeleton 414 and before unmarshaling 432 the reply results at the client side. The post-reply filters 442 and 430 are applied after marshaling 440 of result values on in the skeleton 414 and after unmarshaling 432 the results at the client side.

Transform filters may also be employed to implement encryption and decryption of data or data compression. For example, client transform filter 428 could be employed to encrypt data which is decrypted by server transform filter 452 and server transform filter 444 would in turn encrypt data which is decrypted by client transform filter 436. There are two kinds of transform filters supported in the presently preferred embodiment of the invention, the request filter and the reply filter. The request filters, 428, 452, are invoked on the client side after all pre and post filters have been applied to the request message and on the server before pre and post filters are applied to the request message. The reply filters, 444, 436, are invoked on the server side after all pre and post filters have been applied to the reply message and on the client side before pre and post filters are applied to the reply message. The transform filters are applied only to the message body, not to the message header, because the object which is a part of the message header contains information that is required by the object request broker for dispatching the message to the appropriate subcontract and for selecting what particular transform filters to apply. However, a dummy message header could be generated in accordance with conventional protocols to allow for the application of transformation to the message header. This would allow for a proper dispatching to the correct subcontract.

Filters are registered in both the client and the server before they can be used. The client side filter registry 418 and the server side registry 420 are illustrated in more detail in FIG. 5. As with FIG. 4, elements in FIG. 5 which correspond to elements in FIGS. 3 and 4 have been given corresponding numeral designations. Generally, the order of filter application is important so that linked lists of filters are actually registered. The linked list indicates both the filters and the their order of application. Filters are implementation specific, so that the server side registration takes place at the implementation level. The client side registration takes place at the object request broker level, since the client is unaware of the implementation of an object.

Figure 5:
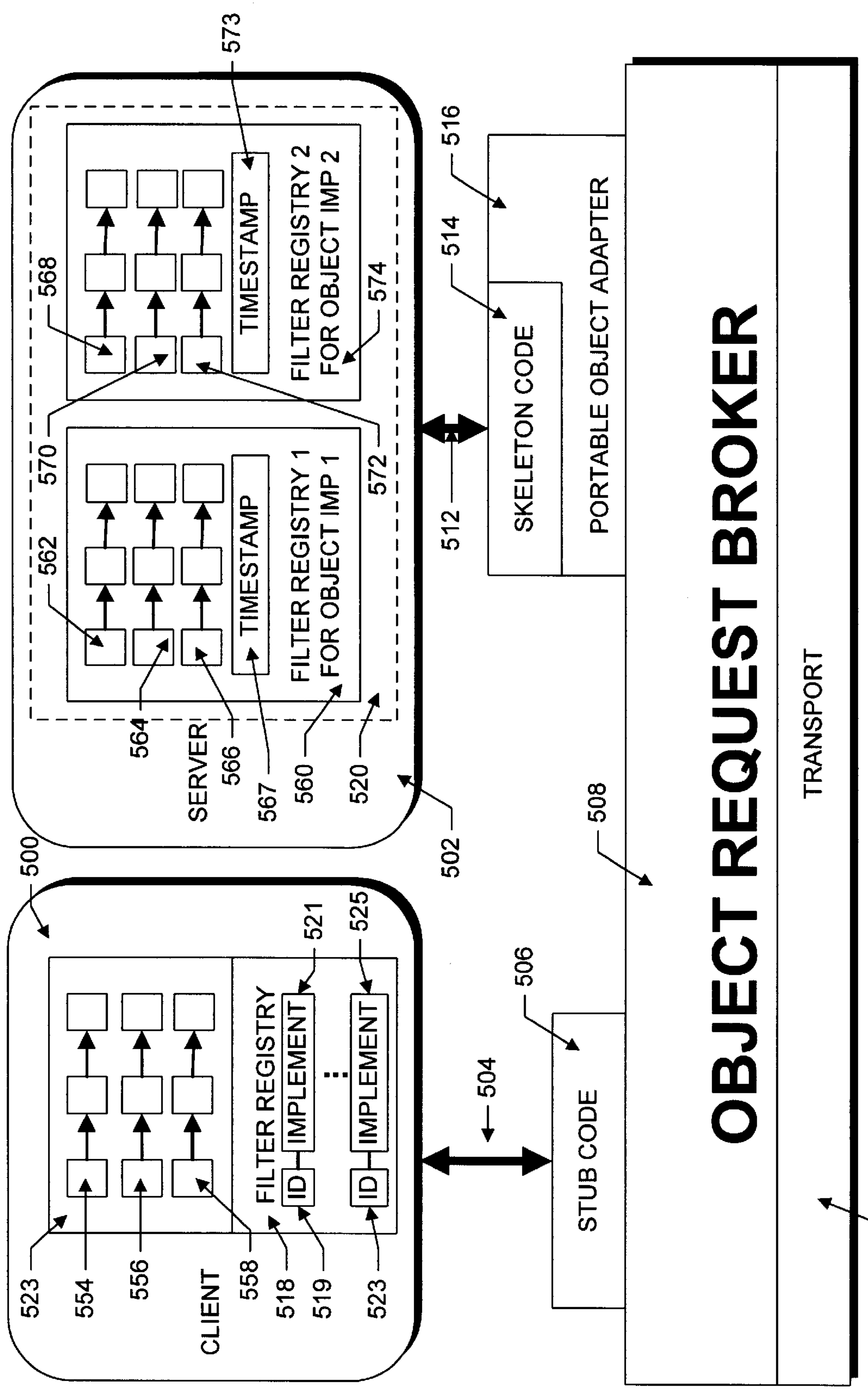
FIG. 5 is a block schematic diagram illustrating a more detailed view of the client and server filter registries, in accordance with the principles of the invention.

Referring to FIG. 5, the client 500 includes a filter registry 518 which includes unordered mappings from filter identifiers 519 and 523 to client filter implementations 521 and 525, respectively. There is one client filter registry for each client process, where each entry includes the filters to be invoked on the client side, associating filter names and implementations. These could be the filters registered with the ORB on the client side using __register__filters(), or those that are dynamically downloaded from the server. A filter implementation group 523 includes ordered filter interface lists for pre-filters 554, post-filters 556, and transform-filters 558. Such lists are preferably created by the ORB in response to a __retrieve__filters() invocation. Each client object, that is, each client side representation of a CORBA object found in a process, has a filter implementation group 523. In the presently preferred embodiment, the client contains a cache which maintains a mapping from object implementation identifiers to filter implementation groups. The object implementation identifiers include the host name of a the server, the server ID, and the implementation ID. On the server side, registration takes place on an object implementation level. Therefore, the server 502 includes many filter registries 520, of which filter registry 1, 560 and filter registry 2, 574 are shown. Each registry contains linked lists of pre-, post-, and transform filter identifications. For example filter registry 560 on the server side, using the numbers from the filter implementation group 523 on the client side, contains three lists, list 562 corresponding to pre-filters, list 564 corresponding to post-filters and list 566 corresponding to transform-filters. Similarly, filter registry 574 contains three lists, list 568 corresponding to pre-filters, list 570 corresponding to post-filters and list 572 corresponding to transform-filters. Each of registries 560 and 574 also contain time stamps 567 and 573, respectively. These time stamps are used, as discussed in detail below, to indicate the current composition of the corresponding filter registry.

Two filter registration application programming interfaces (APIs): "__register__filter()", and "__remove__filter()", are located on the object request broker object which enable program developers to register and remove filters on the client side. There are four filter registration APIs on the server: "__register__filter()", "__register__filter__after()", "__register__filter__before()" and "__remove__filter()". These APIs permit the server to register a filter either at a default location (the end of the linked list) or relative to a previously-registered filter in the list of filter names. The remove API removes a specified filter. The filters are registered by name and each filter has a unique name which can be generated hierarchically.

Figure 6:
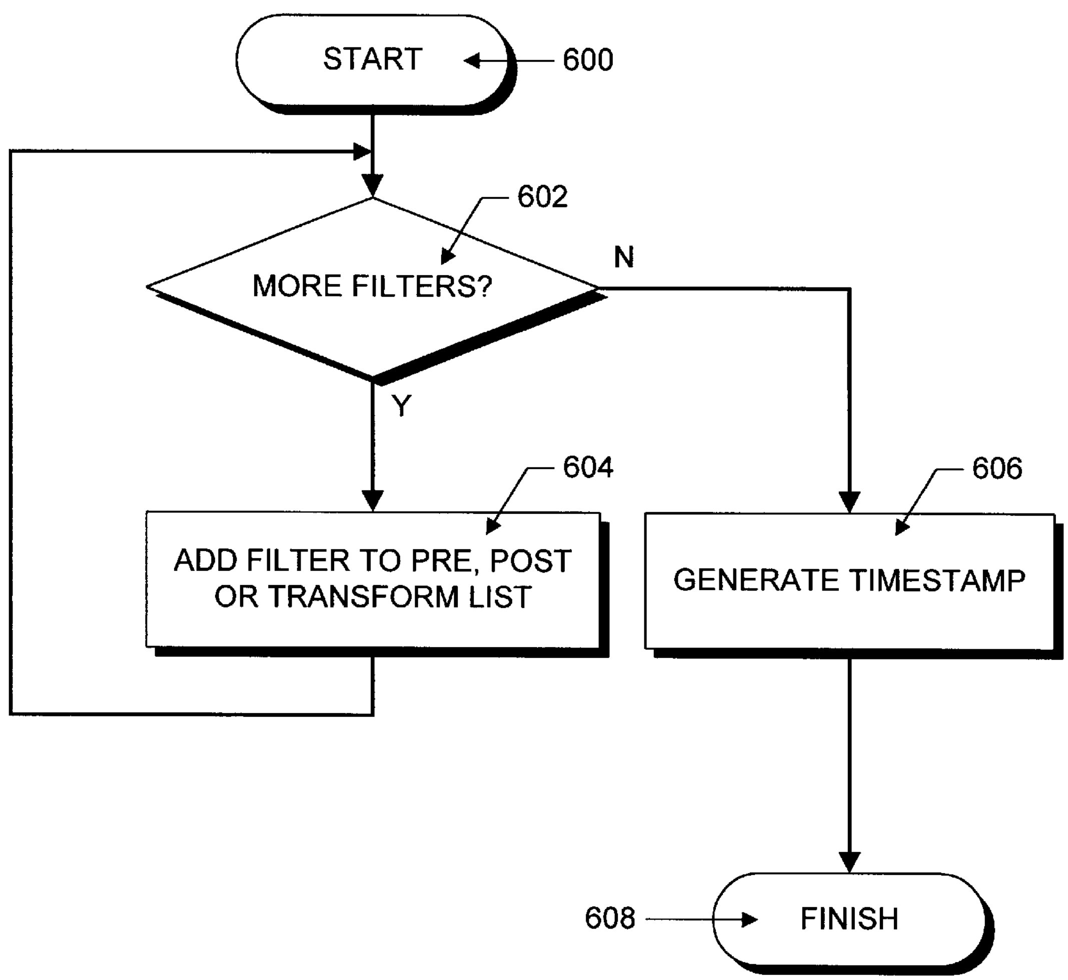
FIG. 6 is a flowchart illustrating the registration of filters in accordance with the principles of the present invention.

The flowchart of FIG. 6 illustrates the server filter registration process. Registration begins at step 600, then proceeds to decision block 602, where it is determined whether more filters are to be registered or not. If there are more filters to register, the process proceeds to step 604, where the next filter is registered using the APIs described above. From step 604, the process returns to step 602. In case there are no more filters to be registered, the process proceeds from step 602 to step 606, where the server generates a timestamp. The timestamp may be an actual time designation or any other designation which indicates a time ordering. For example, the timestamp could be a combination of Unix time and the process ID, or simply a number which monotonically increases. The timestamp is saved with the filter list and updated whenever there are any changes to the filter list. After step 606, the process proceeds to its termination at step 608.

A client can obtain a list of all filters supported by the server's implementation by making the special method call, "_retrieve_filters()", to the server. The server returns three lists of the names of all pre-, post- and transform filters associated with the object implementation. The client can then construct a list of filters in the order in which they should be applied. In an alternative embodiment, filter lists for all implementations can be cached at the host implementation ID level.

In the presently preferred embodiment of the invention, the lists of filters can be changed any time, even as the system is running. Conventional systems require that the server be shut down in order to notify clients of the new filter list. Rather than requiring the client to request current filter lists each time an invocation is made, the timestamp previously mentioned is used to "authenticate" the filter list used by the client at the server side before application of the filters. Specifically, after the timestamp has been obtained, in all subsequent method invocations, the client sends its copy of the time stamp to the server in the service context list field of the request message. The server retrieves the time stamp from the context list field and compares it against its own timestamp copy, which it updates with adjustments to the filter list. If there is a mismatch in timestamps, the server returns an exception to the client and, in response, the client re-invokes the "_retrieve_filters()" method on the server to obtain a new filter list and the latest timestamp. The client then reinvokes the method, using the new filters and timestamp.

Figure 7A:
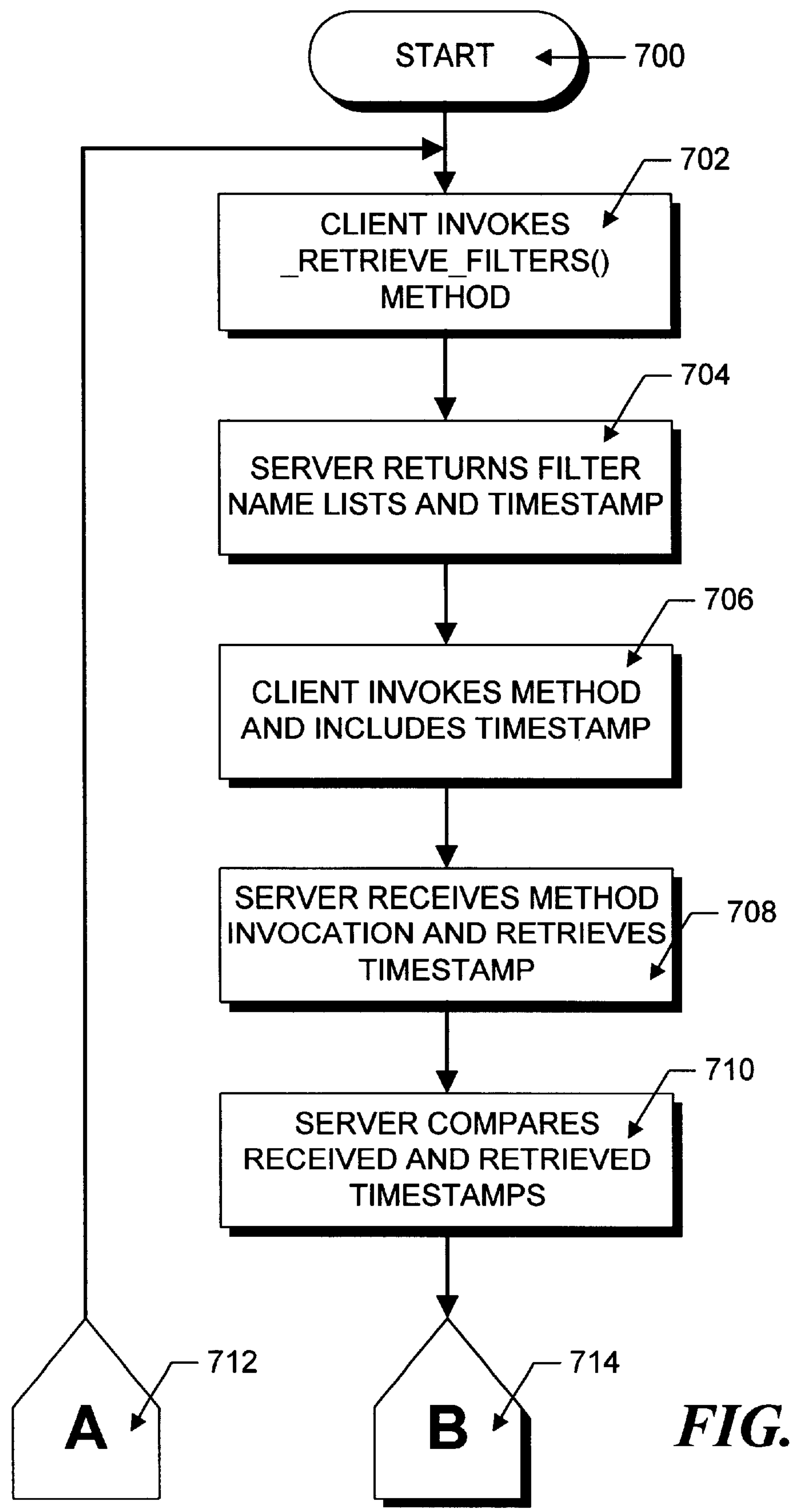
FIGS. 7A and 7B combine to form a flowchart illustrating the maintenance of dynamic filter lists in accordance with the principles of the present invention.
Figure 7B:
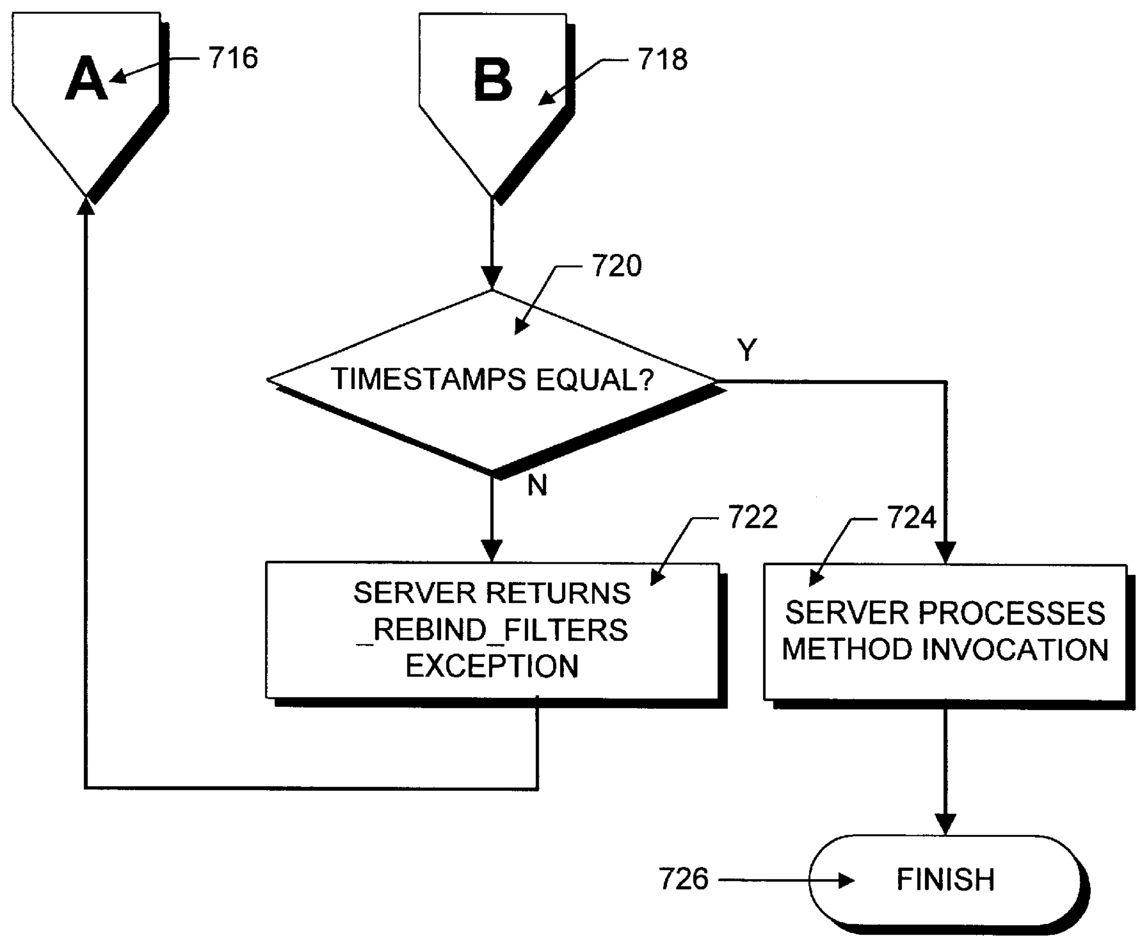

This process is set forth in a flow diagram of FIGS. 7A and 7B which starts at step 700 and proceeds to step 702 where the client invokes a "_retrieve_filters()" method on the server before invoking any other method. In response, the server returns the filter lists and time stamp in step 704. The filter lists are three lists of filter names: one each for pre-filters, post-filters, and transform filters. After returning the filter lists, the process proceeds to step 706, where the client invokes the method as shown in steps 422 through 428 in FIG. 4. During the method invocation process, the client includes the copy of the time stamp that it obtained from the server in step 704 in the service context list of the request message. In step 708, the server receives the method invocation and retrieves its own timestamp, which will have been updated to reflect any adjustments to the filter list.

In step 710, the server compares the time stamp received from the client to its own, updated, time stamp. The process then proceeds, via off-page connectors 714 and 718, to decision block 720. The server compares the timestamps and, if the timestamps do not match, the process proceeds to step 722 where the server returns a "_rebind_filters()" exception to the client. Following the "_rebind_filters()" exception, the process proceeds, via off-page connectors 716 and 712, back to step 702 where the client re-invokes the "_retrieve_filter()" method in order to obtain the latest filter list and timestamp from the server, as previously described.

If, in step 720, the time stamps are found to be equal, the process proceeds to step 724, where the server processes the client method invocation and then proceeds to step 726 to finish.

Figure 8:
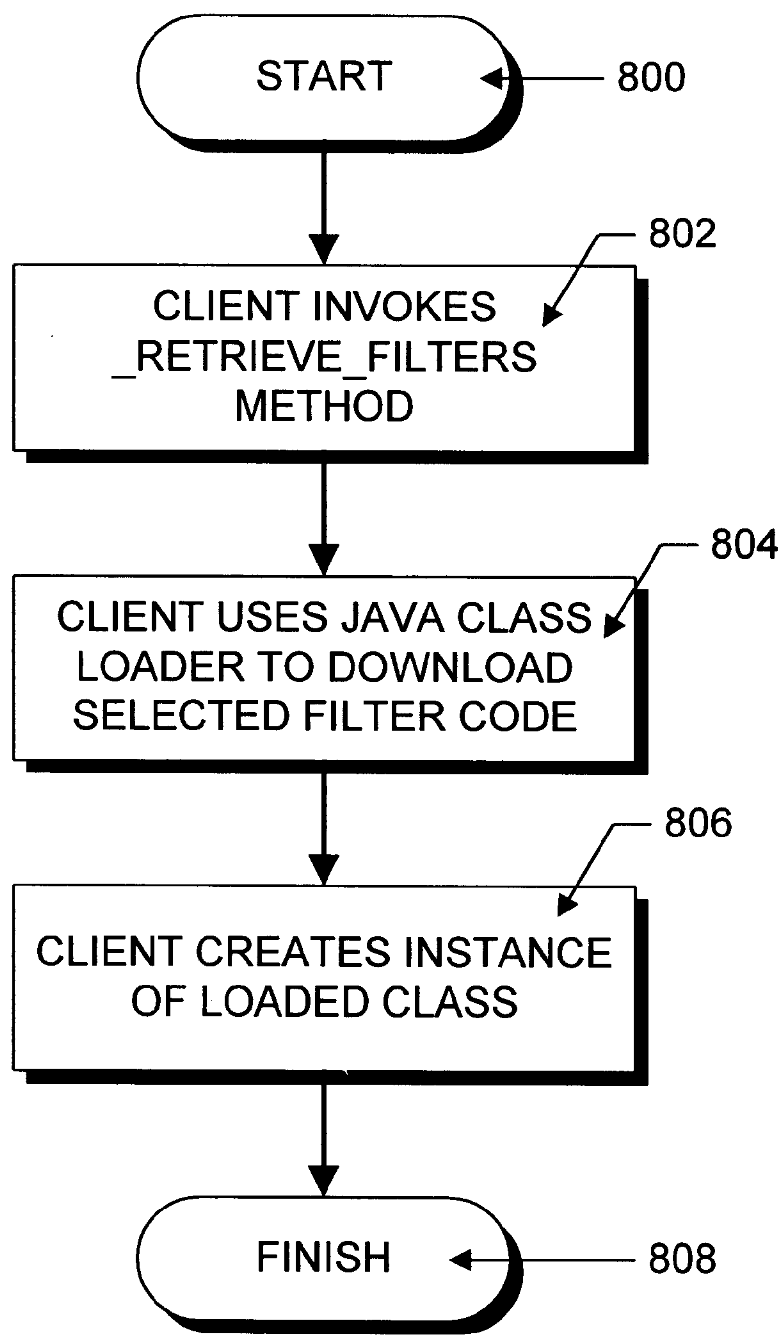
FIG. 8 is a flowchart illustrating the downloading of filter code by a client in accordance with the principles of the present invention.

In another aspect of the invention, filter code may be dynamically downloaded on the client side. In this way the client application programmer can use filters without programming them or understand what kind of filters need be provided. This type of operation is particularly useful with an ORB based on a Java implementation which supports class downloading. In such a system, a client programmer simply writes a normal application; the Java object request broker itself takes care of discovering and applying filters. This process is illustrated in the flow diagram of FIG. 8, where the process starts in step 800 and proceeds to step 802 where the client invokes a "_retrieve_filters()" method. With this step the client retrieves fully qualified filter names from the server. The process then proceeds to step 804 where the client employs a Java class loader to download a selected filter class. The process then proceeds to step 806 where the client creates a new instance of the loaded class using the class constructor method. The process then proceeds to step 808 finish.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims.

What is claimed is:

1. Apparatus for providing a framework for the execution of server-specified code at selected points during a method invocation in a distributed object system having clients and servers, the apparatus comprising:

a plurality of server filters, each of the server filters having an identifier and executing selected code during the method invocation;

a server filter registry in the server object, the server filter registry containing filter identifiers and a method for retrieving the filter identifiers from the registry; and a client filter registry in the client object, the client filter registry containing filter identifiers, exported from the server object and stored in the client filter registry in response to an invocation of the method for retrieving the filter identifiers wherein the client object can selectively invoke one or more of said server filters using the filter identifiers in the client filter registry during a later method invocation in the distributed object system.

2. The apparatus of claim 1 wherein the apparatus includes:

a plurality of filter registries in the server, each registry corresponding to an implementation supported by the server, each filter registry containing filter identifiers and a method for retrieving the filter identifiers from the registry;

a plurality of client filters, each of the client filters having an identifier and executing selected code during the method invocation;

a client filter registry in the client, the client filter registry containing filter identifiers and the corresponding client side filter implementations, and a filter implementation group in each client object, said filter implementation group including filter lists containing client side filter implementations, where the identifiers of the client side filter implementations correspond to the filter identifiers obtained from the server object that corresponds to the client object in response to the method for retrieving filter identifiers from the server object.

3. The apparatus of claim 2 wherein the filter lists correspond to pre filters, post filters, and transform filters.

4. The apparatus of claim 1 wherein a method invoked on the client object also invokes the filters indicated by the client object's filter lists.

5. The apparatus of claim 1 wherein the client contains a filter implementation group cache which maintains a mapping from object implementation identifiers to filter implementation groups, where an object implementation identifier includes the host name of a server, a server identifier, and an implementation identifier.

6. The apparatus of claim 1 wherein the distributed object system includes an object request broker which transmits the method invocation from the client object to the server object and wherein the server filters are located in implementation specific code which connects the server object to the object request broker.

7. The apparatus of claim 6 further comprising a plurality of client filters each having an identifier and being located in the object request broker.

8. The apparatus of claim 7 wherein the client filter registry includes filter identifiers for both the client filters and the server filters.

9. The apparatus of claim 6 wherein the object request broker includes a marshaling and unmarshaling mechanism operable during the method invocation and the plurality of server filters includes a pre-filter which executes code before the marshaling and unmarshaling operates.

10. The apparatus of claim 6 wherein the object request broker includes a marshaling and unmarshaling mechanism operable during the method invocation and the plurality of server filters includes a post-filter which executes code after the marshaling and unmarshaling operates.

11. The apparatus of claim 6 wherein the object request broker includes a marshaling and unmarshaling mechanism operable during the method invocation and the plurality of server filters includes a pre-filter which executes code before the marshaling and unmarshaling operates, a post-filter which executes code after the marshaling and unmarshaling operates and transform filters which execute code before the pre-filter operates and after the post-filter operates.

12. The apparatus of claim 6 wherein the client object utilizes all the server filters effected in the implementation specific code which connects the server object to the object request broker.

13. The apparatus of claim 1 wherein each filter identifier is unique.

14. The apparatus of claim 1 wherein the filter identifiers are hierarchical.

15. The apparatus of claim 1 wherein the server filter registry indicates an order in which the filters are to be invoked.

16. The apparatus of claim 1 wherein the server filter registry and the client filter registry each include an indication of parameters required by each filter.

17. The apparatus of claim 1 further including filter registration application programmer interfaces whereby filters may be added to, and removed from, the plurality of filters and the server filter registry during distributed object system operation.

18. The apparatus of claim 17 wherein the server filter registry includes a storage which stores an indication reflecting the current composition of the plurality of server filters.

19. The apparatus of claim 18 wherein the server object includes a mechanism which sends the indication to the client object.

20. The apparatus of claim 19 wherein the client object includes the indication in the method invocation and the server object includes a mechanism to alert the client object if the indication in the method invocation indicates that the client filter registry does not include the current composition of the plurality of server filters.

21. The apparatus of claim 1 further comprising a mechanism for downloading filter code from the server object to the client object so that the client object can run the filter code.

22. A method for providing a framework for the execution of client-specified code at selected points during a method invocation in a distributed object system having client and server objects, the method comprising the steps of:

(a) constructing a plurality of server filters, each of the server filters having an identifier and executing selected code during the method invocation;

(b) constructing a server filter registry in the server object, the server filter registry containing filter identifiers and a method for retrieving the filter identifiers from the registry;

(c) constructing a client filter implementation group in the client object, the client filter implementation group containing client filter implementations corresponding to filter identifiers exported from server objects and stored in the client filter implementation group in response to an invocation of the method for retrieving the filter identifiers; and (d) using the client object to invoke one or more filters in the filter implementation group during a later method invocation in the distributed object system.

23. The method of claim 22 wherein step (d) comprises the step of:

(e) using the client object to selectively invoke filters that are flagged as optional by said server.

24. The method of claim 23 wherein the distributed object system includes an object request broker which transmits the method invocation from the client object to the server object and wherein step (a) comprises the step of:

(a1) constructing the server filters in implementation specific code which connects the server object to the object request broker.

25. The method of claim 24 further comprising the step of:

(e) constructing a plurality of client filters each having an identifier and being located in the object request broker.

26. The method of claim 25 wherein step (c) comprises the step of:

(c1) constructing the client filter registry with filter identifiers for both the client filters and the server filters.

27. The method of claim 24 wherein the object request broker includes a marshaling and unmarshaling mechanism operable during the method invocation and step (a) comprises the step of:

(a2) constructing a pre-filter which executes code before the marshaling and unmarshaling operates.

28. The method of claim 24 wherein the object request broker includes a marshaling and unmarshaling mechanism operable during the method invocation and step (a) comprises the step of:

(a3) constructing a post-filter which executes code after the marshaling and unmarshaling mechanism operates.

29. The method of claim 24 wherein the object request broker includes a marshaling and unmarshaling mechanism operable during the method invocation and step (a) comprises the steps of:

(a4) constructing a pre-filter which executes code before the marshaling and unmarshaling operates;

(a5) constructing a post-filter which executes code after the marshaling and unmarshaling mechanism operates;

(a6) constructing a transform filter which executes code before the pre-filter; and (a7) constructing a transform filter which executes code after the post-filter.

30. The method of claim 24 wherein step (d) comprises the step of:

(d1) utilizing all the filters effected in the implementation specific code which connects the server object to the object request broker.

31. The method of claim 23 wherein step (a) comprises the step of:

(a8) constructing each filter with a unique identifier.

32. The method of claim 23 wherein step (a) comprises the step of:

(a9) constructing the plurality of filters with hierarchical filter identifiers.

33. The method of claim 23 wherein step (b) comprises the step of:

(b1) constructing the server filter registry to indicate an order in which the filters are to be invoked.

34. The method of claim 23 wherein step (b) includes the step of:

(b2) constructing the server filter registry with an indication of parameters required by each filter, and step (c) comprises the step of:

(c2) constructing the client filter registry with an indication of parameters required by each filter.

35. The method of claim 23 further comprising the step of:

(f) using filter registration application programmer interfaces to add and remove filters from the plurality of filters and the server filter registry during distributed object system operation.

36. The method of claim 35 further comprising the step of:

(g) storing an indication reflecting the current composition of the plurality of server filters in a storage in the server object.

37. The method of claim 36 further comprising the step of:

(h) sending the indication from the server object to the client object.

38. The method of claim 37 further comprising the steps of:

(i) including the indication in the method invocation;

(j) receiving the method invocation in the server object; and (k) alerting the client object if the indication in the received method invocation indicates that the client filter registry does not include the current composition of the plurality of server filters.

39. The method of claim 23 further comprising the step of:

(l) downloading filter code from the server object to the client object so that the client object can run the filter code.

40. A computer program product for providing a framework for the execution of application program-specified code at selected points during a method invocation in a distributed object system having client and server objects, the computer program product comprising a computer usable medium having computer readable program code thereon including:

program code for constructing a plurality of server filters, each of the server filters having an identifier and executing selected code during the method invocation;

program code for constructing a server filter registry in the server object, the server filter registry containing filter identifiers and a method for retrieving the filter identifiers from the registry;

program code for constructing a client filter registry in the client object, the client filter registry containing filter identifiers, exported from the server object and stored in the client filter registry in response to an invocation of the method for retrieving the filter identifiers; and program code in the client object for selectively invoking at least one of the server filters using the filter identifiers in the client filter registry during a later method invocation in the distributed object system.

41. The computer program product of claim 40 wherein the distributed object system includes an object request broker which transmits the method invocation from the client object to the server object and wherein the program code for constructing filters comprises program code for constructing the server filters in implementation specific code which connects the server object to the object request broker.

42. The computer program product of claim 41 further comprising program code for constructing a plurality of client filters, each having an identifier and being located in the object request broker.

43. The computer program product of claim 42 wherein the program code for constructing a client filter registry comprises program code for constructing the client filter registry with filter identifiers for both the client filters and the server filters.

44. The computer program product of claim 41 wherein the object request broker includes a marshaling and unmarshaling mechanism operable during the method invocation and the program code for constructing the plurality of filters comprises program code for constructing a pre-filter which executes code before the marshaling and unmarshaling operates.

45. The computer program product of claim 41 wherein the object request broker includes a marshaling and unmarshaling mechanism operable during the method invocation and the program code for constructing a plurality of filters comprises program code for constructing a post-filter which executes code after the marshaling and unmarshaling mechanism operates.

46. The computer program product of claim 41 wherein the object request broker includes a marshaling and unmarshaling mechanism operable during the method invocation and the program code for constructing a plurality of filters comprises:

program code for constructing a pre-filter which executes code before the marshaling and unmarshaling operates;

program code for constructing a post-filter which executes code after the marshaling and unmarshaling mechanism operates;

program code for constructing a transform filter which executes code before the pre-filter; and program code for constructing a transform filter which executes code after the post-filter.

47. The computer program product of claim 41 wherein the program code for invoking at least one of the server filters comprises program code for utilizing all the filters effected in the implementation specific code which connects the server object to the object request broker.

48. The computer program product of claim 47 wherein the program code for constructing a plurality of filters comprises program code for constructing each filter with a unique identifier.

49. The computer program product of claim 40 wherein the program code for constructing a plurality of filters comprises program code for constructing the plurality of filters with hierarchical filter identifiers.

50. The computer program product of claim 40 wherein the program code for constructing the server filter registry comprises program code for constructing the server filter registry to indicate an order in which the filters are to be invoked.

51. The computer program product of claim 40 wherein the program code for constructing the server filter registry comprises program code for constructing the server filter registry with an indication of parameters required by each filter, and the program code for constructing the client filter registry comprises program code for constructing the client filter registry with an indication of parameters required by each filter.

52. The computer program product of claim 40 further comprising filter registration application programmer interfaces for adding and removing filters from the plurality of filters and the server filter registry during distributed object system operation.

53. The computer program product of claim 52 further comprising program code for storing an indication reflecting the current composition of the plurality of server filters in a storage in the server object.

54. The computer program product of claim 53 further comprising program code for sending the indication from the server object to the client object.

55. The computer program product of claim 54 further comprising:

program code for including the indication in the method invocation;

program code for receiving the method invocation in the server object; and program code for alerting the client object if the indication in the received method invocation indicates that the client filter registry does not include the current composition of the plurality of server filters.

56. The computer program product of claim 40 further comprising program code for downloading filter code from the server object to the client object so that the client object can run the filter code.

57. A computer data signal embodied in a carrier wave for providing a framework for the execution of application program-specified code at selected points during a method invocation in a distributed object system having client and server objects, comprising:

program code for constructing a plurality of server filters, each of the server filters having an identifier and executing selected code during the method invocation;

program code for constructing a server filter registry in the server object, the server filter registry containing filter identifiers and a method for retrieving the filter identifiers from the registry;

program code for constructing a client filter registry in the client object, the client filter registry containing filter identifiers, exported from the server object and stored in the client filter registry in response to an invocation of the method for retrieving the filter identifiers; and program code in the client object for selectively invoking at least one of the server filters using the filter identifiers in the client filter registry during a later method invocation in the distributed object system.

58. The computer data signal as defined in claim 57 wherein the distributed object system includes an object request broker which transmits the method invocation from the client object to the server object and wherein the program code for constructing filters comprises program code for constructing the server filters in implementation specific code which connects the server object to the object request broker.

59. The computer data signal as defined in claim 58 further comprising program code for constructing a plurality of client filters, each having an identifier and being located in the object request broker.

60. The computer data signal as defined in claim 59 wherein the program code for constructing a client filter registry comprises program code for constructing the client filter registry with filter identifiers for both the client filters and the server filters.

61. The computer data signal as defined in claim 58 wherein the object request broker includes a marshaling and unmarshaling mechanism operable during the method invocation and the program code for constructing the plurality of filters comprises program code for constructing a pre-filter which executes code before the marshaling and unmarshaling operates.

62. The computer data signal as defined in claim 58 wherein the object request broker includes a marshaling and unmarshaling mechanism operable during the method invocation and the program code for constructing a plurality of filters comprises program code for constructing a post-filter which executes code after the marshaling and unmarshaling mechanism operates.

63. The computer data signal as defined in claim 58 wherein the object request broker includes a marshaling and unmarshaling mechanism operable during the method invocation and the program code for constructing a plurality of filters comprises:

program code for constructing a pre-filter which executes code before the marshaling and unmarshaling operates;

program code for constructing a post-filter which executes code after the marshaling and unmarshaling mechanism operates;

program code for constructing a transform filter which executes code before the pre-filter; and program code for constructing a transform filter which executes code after the post-filter.

64. The computer data signal as defined in claim 58 wherein the program code for invoking at least one of the server filters comprises program code for utilizing all the filters effected in the implementation specific code which connects the server object to the object request broker.

65. The computer data signal as defined in claim 64 wherein the program code for constructing a plurality of filters comprises program code for constructing each filter with a unique identifier.

66. The computer data signal as defined in claim 57 wherein the program code for constructing a plurality of filters comprises program code for constructing the plurality of filters with hierarchical filter identifiers.

67. The computer data signal as defined in claim 57 wherein the program code for constructing the server filter registry comprises program code for constructing the server filter registry to indicate an order in which the filters are to be invoked.

68. The computer data signal as defined in claim 57 wherein the program code for constructing the server filter registry comprises program code for constructing the server filter registry with an indication of parameters required by each filter, and the program code for constructing the client filter registry comprises program code for constructing the client filter registry with an indication of parameters required by each filter.

69. The computer data signal as defined in claim 57 further comprising filter registration application programmer interfaces for adding and removing filters from the plurality of filters and the server filter registry during distributed object system operation.

70. The computer data signal as defined in claim 69 further comprising program code for storing an indication reflecting the current composition of the plurality of server filters in a storage in the server object.

71. The computer data signal as defined in claim 70 further comprising program code for sending the indication from the server object to the client object.

72. The computer data signal as defined in claim 71 further comprising:

program code for including the indication in the method invocation;

program code for receiving the method invocation in the server object; and program code for alerting the client object if the indication in the received method invocation indicates that the client filter registry does not include the current composition of the plurality of server filters.

73. The computer data signal as defined in claim 57 further comprising program code for downloading filter code from the server object to the client object so that the client object can run the filter code.

* * * * *